(12) United States Patent
Aoyama et al.

(10) Patent No.: US 6,691,655 B2
(45) Date of Patent: Feb. 17, 2004

(54) CONTROL SYSTEM AND METHOD FOR AN INTERNAL COMBUSTION ENGINE

(75) Inventors: Shunichi Aoyama, Kanagawa (JP); Shinichi Takemura, Yokohama (JP); Takanobu Sugiyama, Yokohama (JP); Ryosuke Hiyoshi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/417,140

(22) Filed: Apr. 17, 2003

(65) Prior Publication Data

US 2003/0213451 A1 Nov. 20, 2003

(30) Foreign Application Priority Data

May 16, 2002 (JP) ........................................ 2002-140874

(51) Int. Cl.[7] .................................................. F01L 1/34
(52) U.S. Cl. ............................... 123/90.16; 123/90.15; 123/48 B; 123/78 R; 123/78 E; 123/48 R; 123/406.45; 123/406.53
(58) Field of Search ........................... 123/90.16, 90.15, 123/90.11, 90.17, 90.18, 90.27, 90.31, 48 B, 48 R, 78 E, 78 R, 406.45, 406.53, 406.59, 418, 419, 424, 681, 685, 687

(56) References Cited

U.S. PATENT DOCUMENTS

| | | | | |
|---|---|---|---|---|
| 6,125,801 A | * | 10/2000 | Mendler | ................... 123/48 R |
| 6,202,623 B1 | * | 3/2001 | Ehrlich | ..................... 123/197.4 |
| 6,553,949 B1 | * | 4/2003 | Kolmanovsky et al. | ... 123/48 B |

FOREIGN PATENT DOCUMENTS

| | | | | |
|---|---|---|---|---|
| EP | 1 154 134 A2 | 11/2001 | | |
| JP | 2002-021592 A | 1/2002 | ........... | F02D/15/02 |
| JP | 202-089341 A | 3/2002 | ........... | F02D/43/00 |
| JP | 2002-089303 A | 3/2002 | ........... | F02D/13/02 |

OTHER PUBLICATIONS

Aoyama et al., US patent application Publication 2002/0139346, Oct. 3, 2002, "Control System and Method for an Internal Combustion Engine".*
Patent Abstracts of Japan, vol. 2000, No. 26, Jul. 1, 2002, JP 2001-263113, Sep. 26, 2001 (2001-09-26).
Patent Abstracts of Japan, vol. 018, No. 640, Dec. 6, 1994, JP 6-248988, Sep. 6, 1994 (1994-09-06).
Patent Abstracts of Japan, vol. 012, No. 347, Sep. 19, 1988, JP-63-109282, May 13 1988 (1988-05-13).
Patent Abstracts of Japan, vol. 013, No. 234, May 30, 1989, JP 1-045965, Feb. 20, 1989 (1989-02-20).
Patent Abstracts of Japan, vol. 013, No. 369, Aug. 16, 1989, JP 1-125528, May 18, 1989 (1989-05-18).
Patent Abstracts of Japan, vol. 014, No. 198, Apr. 23, 1990, JP 2-040056, Feb. 8, 1990 (1990-02-08).
Patent Abstracts of Japan, vol. 010, No. 092, Apr. 9, 1986, JP 60-230549, Nov. 16, 1985 (1985-11-16).

* cited by examiner

*Primary Examiner*—Thomas Denion
*Assistant Examiner*—Kyle Riddle
(74) *Attorney, Agent, or Firm*—Foley & Lardner

(57) ABSTRACT

A control system for an internal combustion engine is provided. The engine includes a compression ratio control mechanism and an ignition timing control system. The control system comprises an engine control for controlling the compression ratio control mechanism and the ignition timing control system so that the compression ratio is varied depending upon variations of engine rpm, engine load and a warm-up condition of the engine and that when the engine is cold, the ignition timing is retarded from a MBT point and a top dead center position of a piston is made lower in level than that obtained when the engine is hot and operated at corresponding engine rpm and engine load. A method for controlling such an internal combustion engine is also provided.

24 Claims, 13 Drawing Sheets

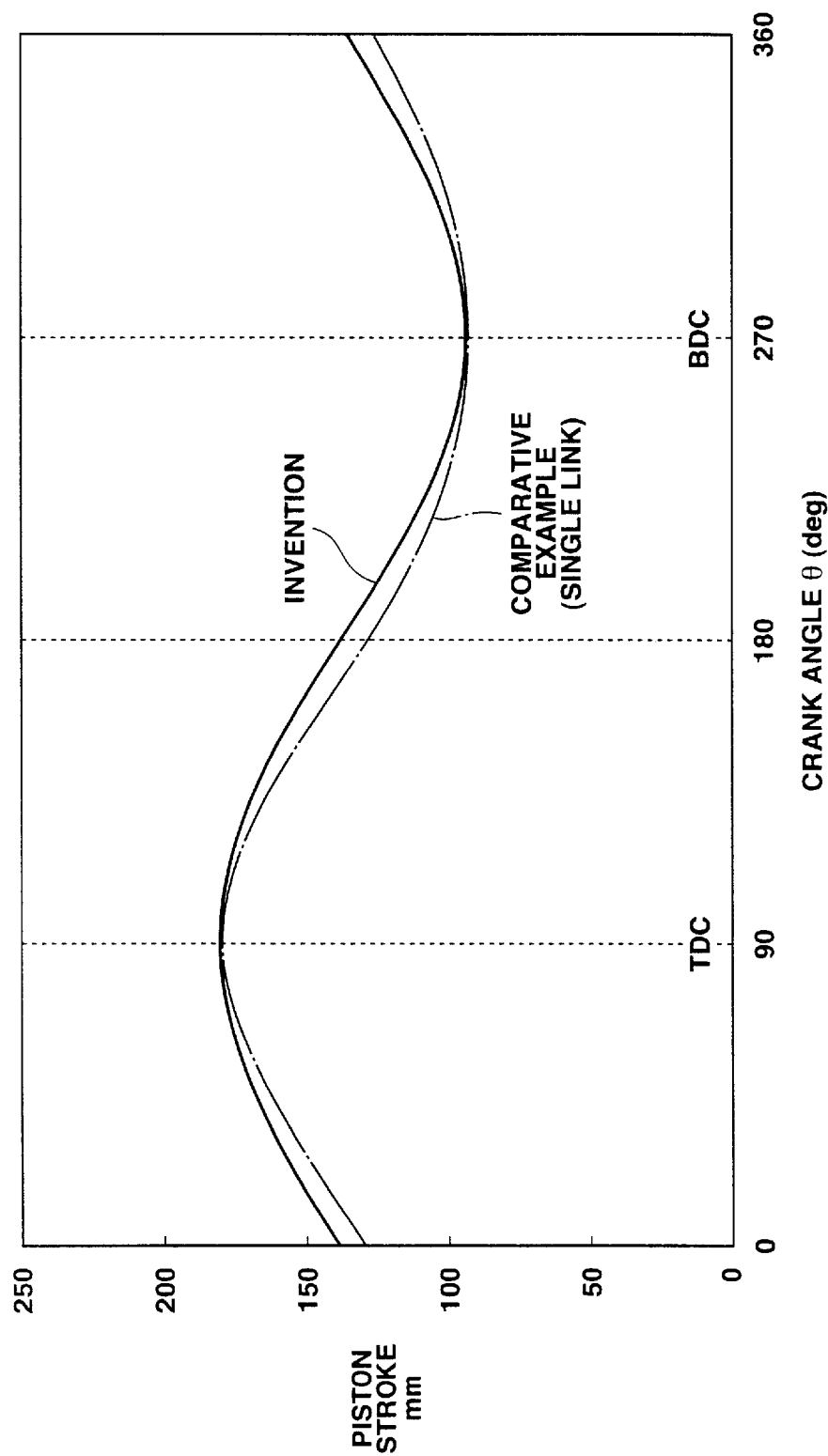

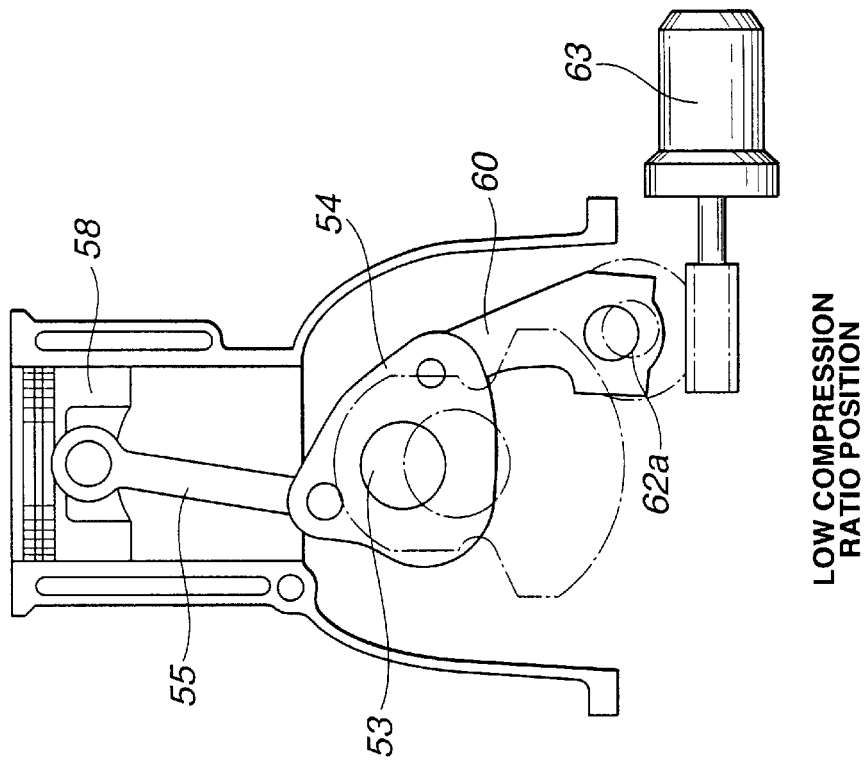
FIG.8A HIGH COMPRESSION RATIO POSITION
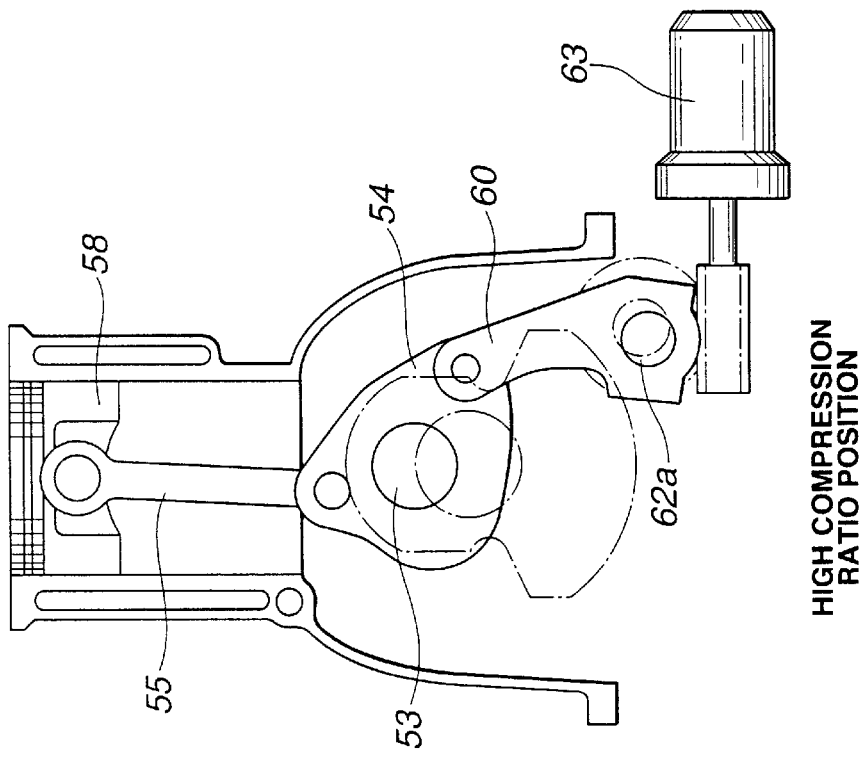
FIG.8B LOW COMPRESSION RATIO POSITION

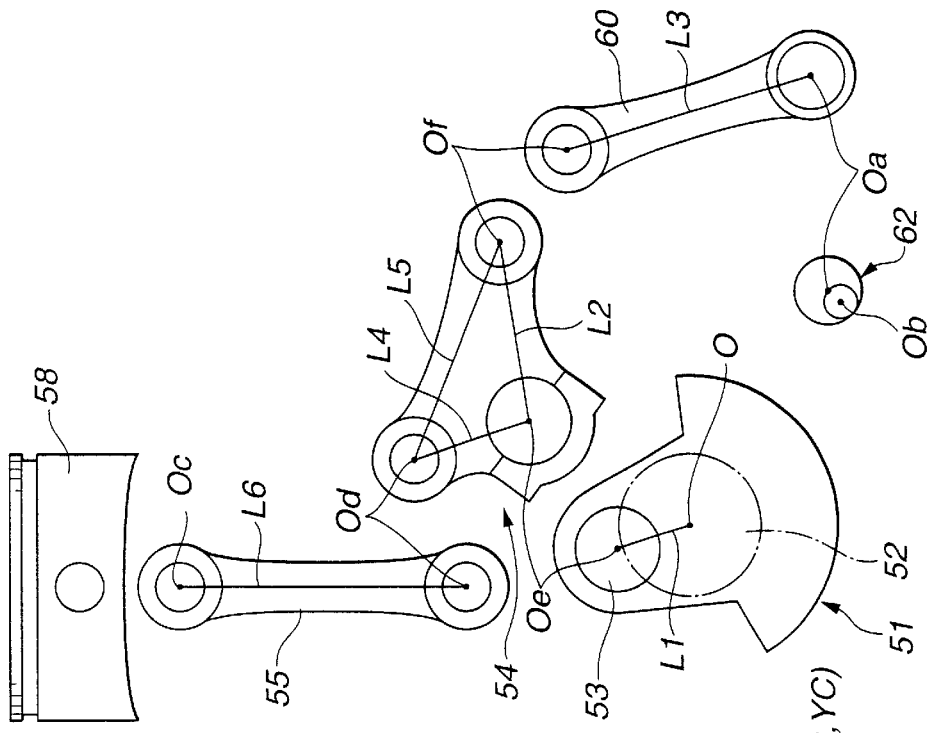
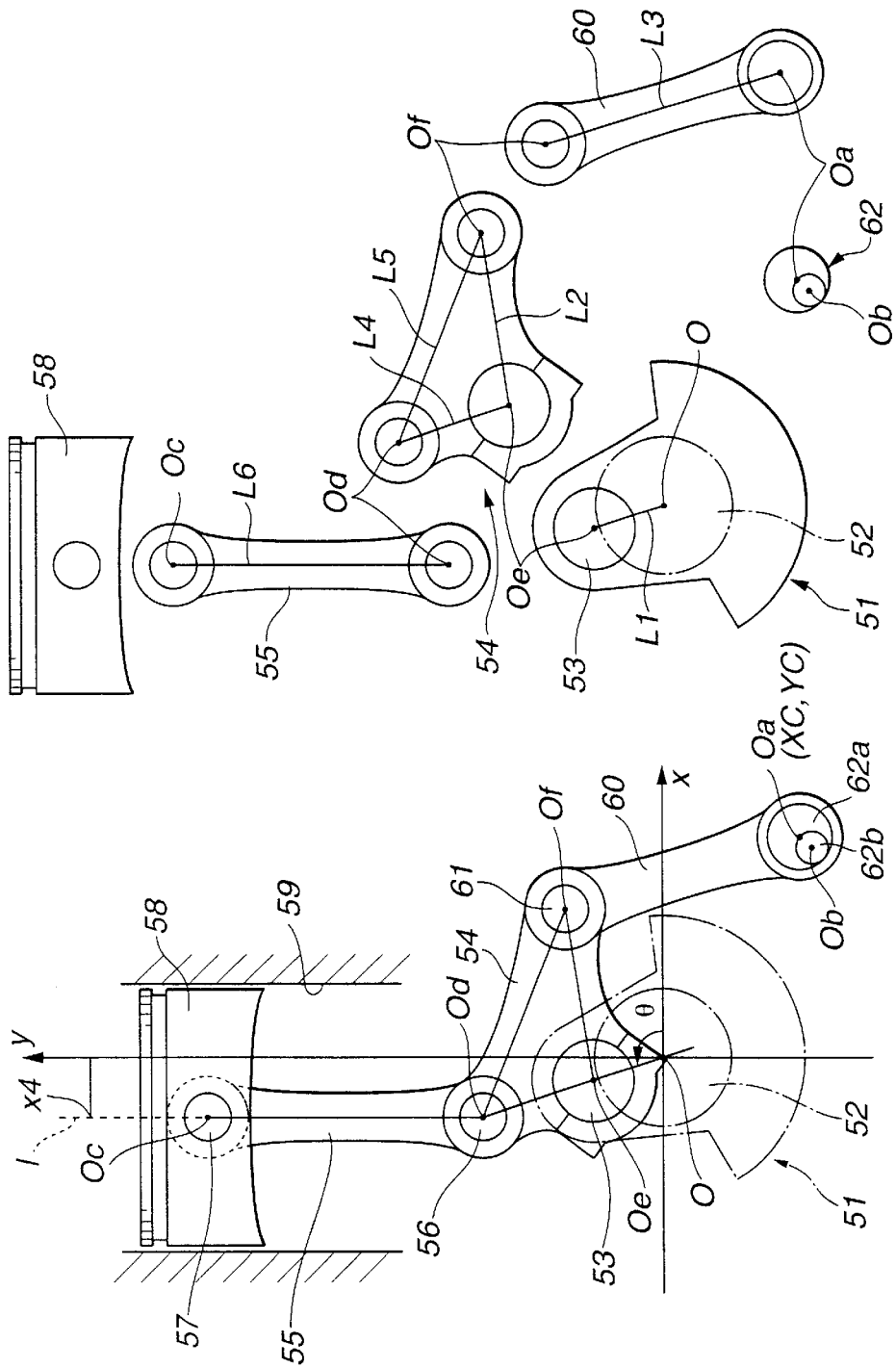

FIG.12

| | | ITEM | RETARD LIMIT | UNBURNT HC | EXHAUST TEMP. |
|---|---|---|---|---|---|
| (1) | INTAKE VALVE CONTROL | RETARD OF IVO<br>· DEVELOPMENT OF VACUUM IN CYLINDER<br>· INCREASE IN PISTON SPEED<br>→INCREASE IN INTAKE MIXTURE FLOW SPEED | ENLARGEMENT | DECREASE | ← |
| (2) | | MAKING INTAKE VALVE LIFT SMALLER<br>→INCREASE IN INTAKE MIXTURE FLOW SPEED | ENLARGEMENT | DECREASE | ← |
| (3) | | RETARD OF IVO<br>(RETARD FROM BDC)<br>· DECREASE IN ACTUAL COMPRESSION RATIO<br>· DECREASE IN INTAKE MIXTURE CHARGING AMOUNT<br>· DECREASE IN INTAKE VACUUM<br>(DETERIORATION OF FUEL ATOMIZATION) | REDUCTION | INCREASE<br>(S/V RATIO<br>IS NOT<br>CHANGED) | → |
| (4) | | ADVANCE OF IVC<br>(ADVANCE FROM BDC)<br>· DECREASE IN ACTUAL COMPRESSION RATIO<br>· DECREASE IN INTAKE MIXTURE CHARING AMOUNT<br>(DETERIORATION OF FUEL ATOMIZATION) | REDUCTION | INCREASE<br>(S/V RATIO<br>IS NOT<br>CHANGED) | → |
| (5) | | IVC→BDC<br>· INCREASE IN ACTUAL COMPRESSION RATIO<br>· INCREASE IN INTAKE MIXTURE CHARGING AMOUNT<br>· INCREASE IN INTAKE VACUUM<br>(IMPROVEMENT IN FUEL ATOMIZATION) | ENLARGEMENT | DECREASE<br>(S/V RATIO<br>IS NOT<br>CHANGED) | ← |
| (6) | COMPRESSION RATIO (EXPANSION RATIO) ε CONTROL | ε→HIGH<br>· INCREASE IN TEMP. AND PRESSURE AT TDC<br>· INCREASE IN COOLING LOSS<br>· INCREASE IN EXPANSION RATIO | ENLARGEMENT | INCREASE<br>(S/V RATIO IS<br>INCREASED) | → |
| (7) | | ε→LOW<br>· DECREASE IN TEMP. AND PRESSURE AT TDC<br>· DECREASE IN COOLING LOSS<br>· DECREASE IN EXPANSION RATIO | REDUCTION | DECREASE<br>(S/V RATIO IS<br>DECREASED) | ← |

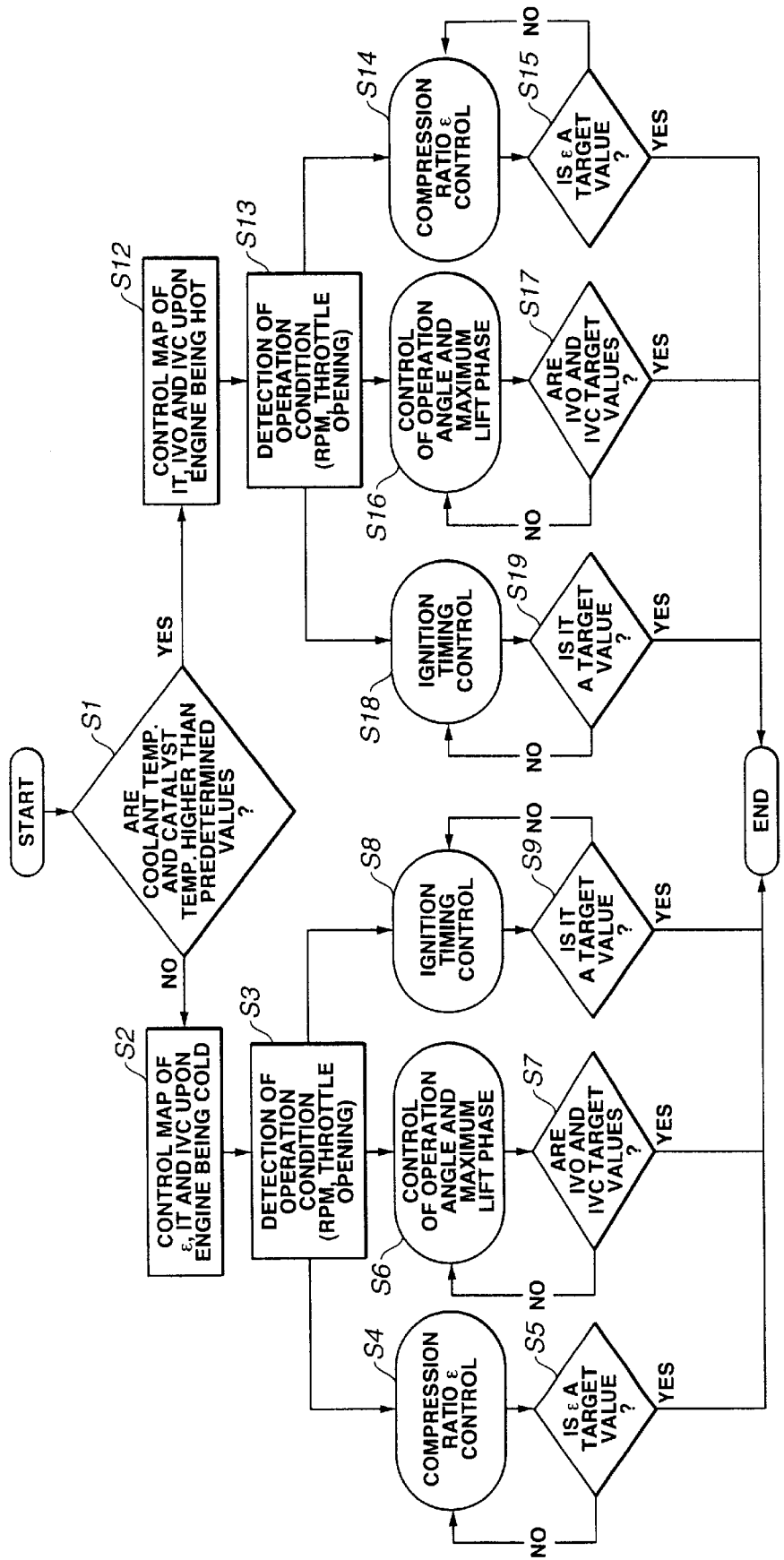

CONTROL SYSTEM AND METHOD FOR AN INTERNAL COMBUSTION ENGINE

BACKGROUND OF THE INVENTION

The present invention relates to a control system for an internal combustion engine having a compression ratio control mechanism capable of varying a compression ratio, a lift and operation angle control mechanism capable of varying a lift and operation angle of an intake valve, and a phase control mechanism capable of varying a maximum lift phase of an intake valve. The present invention further relates to a method for controlling such an internal combustion engine. Still further, the present invention relates to a technique for accelerating warm-up of a spark-ignited gasoline engine.

Heretofore, the assignee of this application proposed various compression ratio control mechanisms for reciprocating internal combustion engines, utilizing a double-link type piston-crank mechanism and adapted to vary the top dead center (TDC) of the piston by moving a portion of a linked structure thereof as disclosed in Japanese Patent Provisional Publication No. 2002-21592. This kind of compression ratio control mechanism varies a mechanical compression ratio of an internal combustion engine, i.e., a nominal compression ratio and generally controls the compression ratio so that a high compression ratio is obtained at partial load for improving the thermal efficiency and a low compression ratio is obtained at high load for avoiding engine knock.

Further, the assignee of this application has proposed a variable valve timing control mechanism that can vary the lift and operation angle of an intake valve simultaneously and continuously and a variable valve timing control mechanism that can attain a wide design freedom of the lift characteristics in combination with a phase control mechanism for varying a maximum lift phase as disclosed in Japanese Patent Provisional Publication Nos. 2002-89303 and 2002-89341.

SUMMARY OF THE INVENTION

As is well known, an exhaust system of an internal combustion engine is provided with a catalytic exhaust gas purifier including an oxidation-reduction catalyst, oxidation catalyst or a reduction catalyst. However, even by the advanced catalyst technology of today, it is the present situation that the catalyst effect on the gas emitted from the engine is largely limited immediately after cold start at which the catalyst temperature is low as compared with that after warm-up of the engine. This problem has long been recognized by the person skilled in the art. Thus, a continuous effort has been made to lower the active temperature of the catalyst and it has been devised to introduce the secondary air into the upstream side of the catalyst for thereby accelerating the time at which the catalyst is chemically activated.

However, the problem basically depends upon how fast the catalyst can reach the temperature at which the catalyst starts conversion. To this end, the ignition timing is delayed during warm-up (i.e., the exhaust gas temperature is elevated by retarding the timing at which combustion starts). This causes a bad influence on the fuel consumption but is widely exercised. However, to elevate the exhaust gas temperature only by retarding the ignition timing has its limit.

On the other hand, paying attention to an expansion ratio of an internal combustion engine (i.e., the ratio of cylinder volume at the time the exhaust valve is open to the cylinder volume at TDC), a higher expansion ratio is desirable for maximizing the effective work of the combustion gas and a lower expansion ratio is desirable for making higher the exhaust gas temperature for accelerating activation of the catalyst. By lowering the expansion ratio and thereby lowering the ratio at which the energy of the combustion gas is converted to the work, the exhaust gas temperature can be elevated. In this connection, advance of the opening timing of the exhaust valve can produce an exhaust gas temperature elevating effect since the combustion gas in the middle of expansion can be discharged in an early stage. However, since the combustion gas in a state of being high in pressure is discharged through the exhaust valve, a considerable amount of heat is taken away from the combustion gas due to transmission of heat by a portion of the engine around the exhaust valve and therefore the exhaust gas temperature cannot be elevated efficiently.

It is accordingly an object of the present invention to provide a control system for an internal combustion engine having a compression ratio control mechanism, a lift and operation angle control mechanism and a phase control mechanism, which can raise the exhaust temperature efficiently by lowering the geometrical expansion ratio of the engine by means of the compression ratio control mechanism while at the same time by retarding the ignition timing.

It is a further object of the present invention to provide a method for controlling an internal combustion engine, which is carried out by the control system of the foregoing character.

According to an aspect of the present invention, there is provided a control system for an internal combustion engine having a compression ratio control mechanism capable of varying a compression ratio of the engine by varying a top dead center position of a piston and an ignition timing control system capable of varying an ignition timing of the engine, the control system comprising an engine control unit for controlling the compression ratio control mechanism and the ignition timing control system so that the compression ratio is varied depending upon variations of engine rpm, engine load and a warm-up condition of the engine and that when the engine is cold, the ignition timing is retarded from a MBT point and the piston top dead center position is made lower in level than that obtained when the engine is hot and operated at corresponding engine rpm and engine load.

According to another aspect of the present invention, there is provided an internal combustion engine comprising a compression ratio control mechanism capable of varying a compression ratio of the engine by varying a top dead center position of a piston, an ignition timing control system capable of varying an ignition timing of the engine, and a control unit for controlling the compression ratio control mechanism and the ignition timing control system so that the compression ratio is varied depending upon variations of engine rpm, engine load and a warm-up condition of the engine and that when the engine is cold, the ignition timing is retarded from a MBT point and the piston top dead center position is made lower in level than that obtained when the engine is hot and operated at corresponding engine rpm and engine load.

According to a further aspect of the present invention, there is provided a method for controlling an internal combustion engine having a compression ratio control mechanism capable of varying a compression ratio of the engine by varying a top dead center position of a piston and an ignition timing control system capable of varying an ignition timing of the engine, the method comprising controlling the compression ratio control mechanism and the ignition timing control system so that the compression ratio is varied depending upon variations of engine rpm, engine load and a warm-up condition of the engine and that when the engine is cold, the ignition timing is retarded from a MBT point and the piston top dead center position is made lower in level than that obtained when the engine is hot and operated at corresponding engine rpm and engine load.

BRIEF DESCRIPTION OF THE DRAWINGS

FIG. 7 is a diagram showing piston stroke characteristics of a double-link type piston-crank mechanism serving as a compression ratio control mechanism employed in the engine of FIG. 1;

FIGS. 8A and 8B are schematic views for illustrating operations of the compression ratio control mechanism;

FIGS. 9A and 9B are schematic views of the compression ratio control mechanism for illustrating a link structure for obtaining a simple harmonic motion;

FIG. 12 illustrates influences of intake valve operation characteristics and a compression ration on an exhaust gas temperature;

FIG. 14 is a flowchart of a control routine of a compression ratio, etc. to be executed by the control system of FIG. 1.

DESCRIPTION OF THE PREFERRED EMBODIMENT

Figure 1:
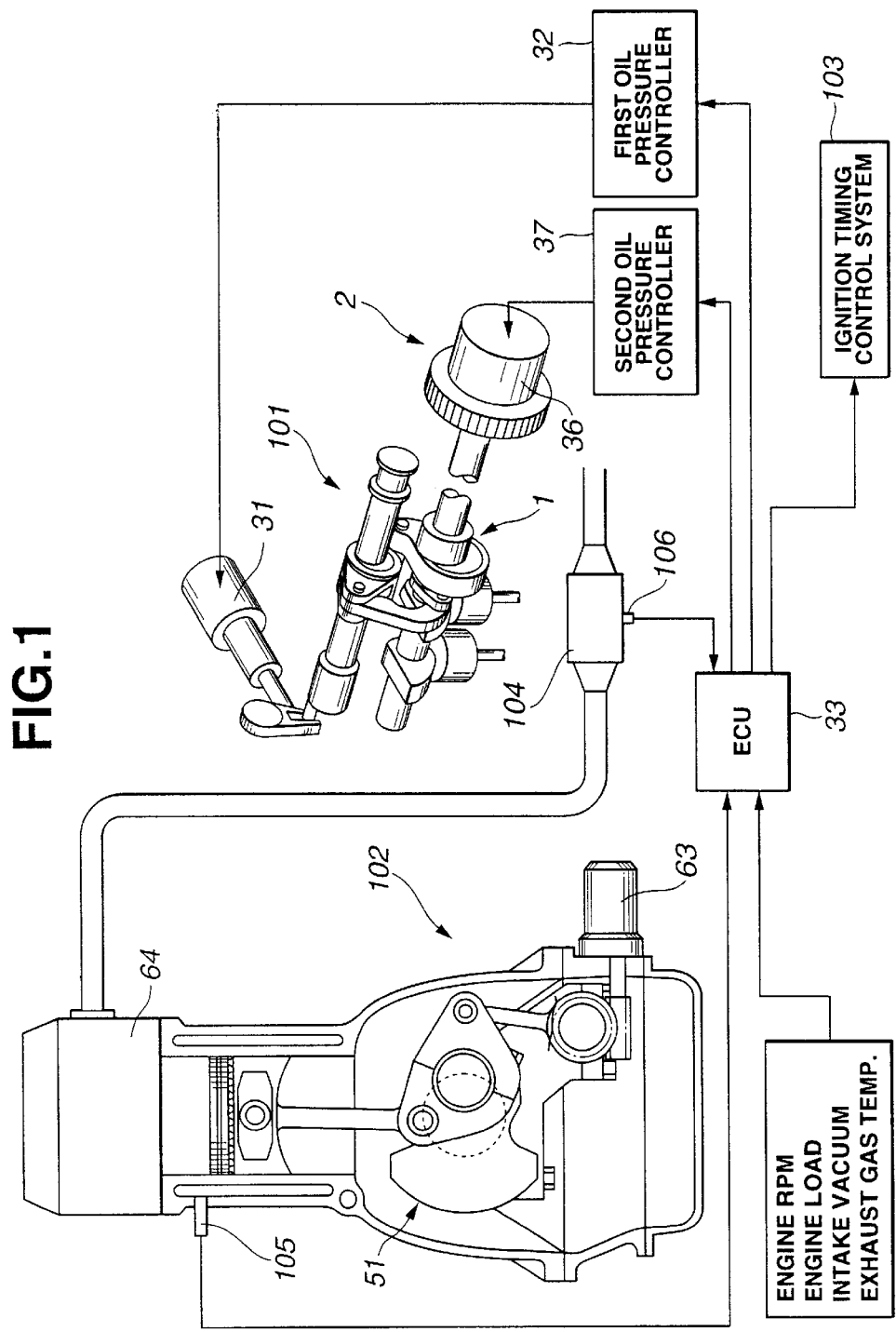
FIG. 1 is a schematic view of a control system for an internal combustion engine having a variable valve timing control apparatus, according to an embodiment of the present invention.

Referring to FIG. 1, an internal combustion engine includes variable valve timing control apparatus 101 for varying intake valve opening and closing timings, compression ratio control mechanism 102 for varying nominal compression ratio $\epsilon$ of the engine, ignition timing control system 103 for varying an ignition timing, and catalytic exhaust gas purifier 104 disposed in an exhaust system.

Figure 2:
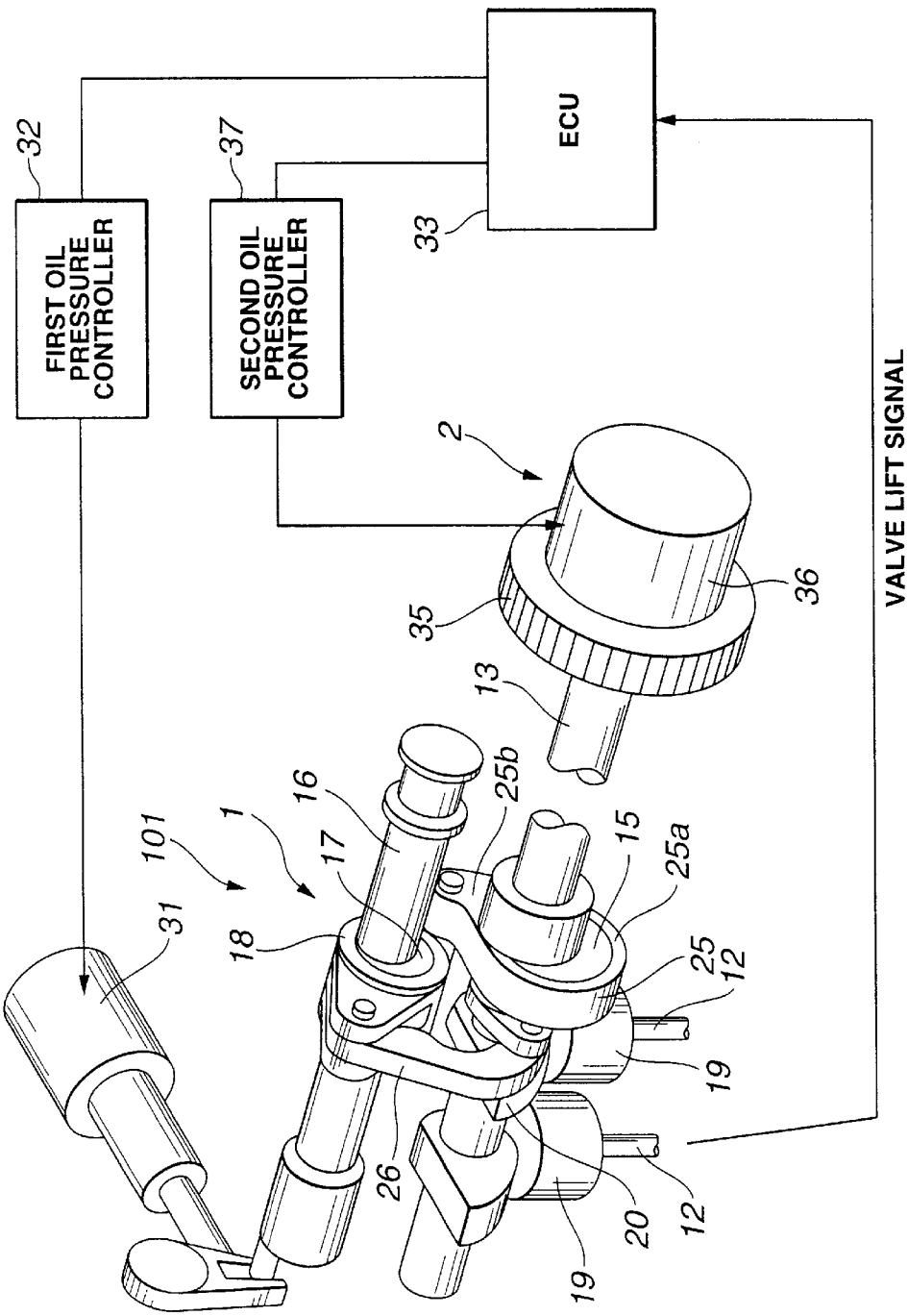
FIG. 2 is an enlarged perspective view of the variable valve timing control apparatus of FIG. 1.

Variable valve timing control apparatus 101 is shown in an enlarged scale in FIG. 2 and includes lift and operation angle control mechanism 1 for varying a lift and operation angle of intake valve 12 and phase control mechanism 2 for varying a phase of intake valve 12, i.e., a maximum lift phase of intake valve 12 relative to a rotational phase of crankshaft 51.

Firstly, with additional reference to FIGS. 3A and 3B, lift and operation angle control mechanism 1 will be described. Lift and operation angle control mechanism 1 is structurally the same as that previously proposed by the same assignee of this application as disclosed in Japanese Patent Provisional Publication Nos. 2002-89303 and 2002-89341 together with phase control mechanism 2, so that only brief description will be made thereto hereinafter.

Lift and operation angle control mechanism 1 includes hollow drive shaft 13 rotatably supported on cylinder head 64 by cam brackets (not shown), eccentric cam 15 force-fitted or otherwise fixedly attached to drive shaft 13, control shaft 16 disposed above and in parallel with drive shaft 13 and rotatably supported on cylinder head 64 by the above described cam brackets, rocker arm 18 mounted on eccentric cam portion 17 of control shaft 16 for oscillation motion, and oscillation cam 20 engaging tappet 19 provided to an upper end portion of intake valve 12. Eccentric cam 15 and rocker arm 18 are operatively connected by pivotal link 25, and rocker arm 18 and oscillation cam 20 are operatively connected by connecting rod 26.

Drive shaft 13 is driven by crankshaft 51 of the engine by way of a timing chain or timing belt (not shown).

Eccentric cam 15 has a circular external surface the center of which is offset from a rotational axis of drive shaft 13 by a predetermined amount. On the circular external surface is rotatably fitted or mounted annular base portion 25a of pivotal link 25.

Rocker arm 18 is mounted at a central portion thereof on eccentric cam portion 17 and has an end portion to which protruded arm portion 25b of above described pivotal link 25 is pivotally connected and another end portion to which an upper end portion of connecting rod 26 is pivotally connected. Eccentric cam portion 17 has a geometric center that is offset from the rotational axis of control shaft 16 so that an axis of oscillation of rocker arm 18 varies depending upon a variation of a rotational position or phase of control shaft 16.

Oscillation cam 20 is rotatably mounted on drive shaft 13 and has laterally protruded end portion 20a to which a lower end portion of connecting link 26 is pivotally connected. Oscillation cam 20 has at its lower side thereof basic circular or dwell surface 24a and cam or lift surface 24b extending from basic circular surface 24a toward above described end portion 20a so as to have a predetermined curved profile. Basic circular surface 24a and cam surface 24b are brought into engagement with the upper surface of tappet 19 in response to oscillation of oscillation cam 20.

Namely, basic circular surface 24a serves as a base circle area that regulates an amount of lift to zero. When oscillation cam 20 is turned or rotated to bring cam surface 24b serving as a lift or rise area into contact with tappet 19, there is caused a lift of intake valve 12 that increases gradually with further rotation of oscillation cam 20. In the meantime, between the basic circular area and the lift area is provided a small ramp area.

Control shaft 16 is constructed so as to be rotatable within a predetermined rotational angle range by being driven by hydraulic, lift and operation angle control actuator 31 installed on an end of control shaft 16 as shown in FIGS. 1 and 2. Supply of hydraulic pressure to actuator 31 is performed by first hydraulic pressure controller 32 in response to a control signal from engine control unit (ECU) 33.

The operation of lift and operation angle control mechanism 1 will now be described. Rotation of drive shaft 13 causes pivotal link 25 to move up and down by the operation of eccentric cam 15. This causes rocker arm 18 to oscillate thereby causing oscillation cam 20 to oscillate. Oscillating motion of oscillation cam 20 causes tappet 19 to move up and down thereby causing intake valve 19 to open and close.

In this connection, when a variation of the rotational position or phase of control shaft 16 is caused by control shaft 16, a variation of the initial position of rocker arm 18 is caused, thus causes a variation of the initial position of oscillation cam 20.

Figure 3A:
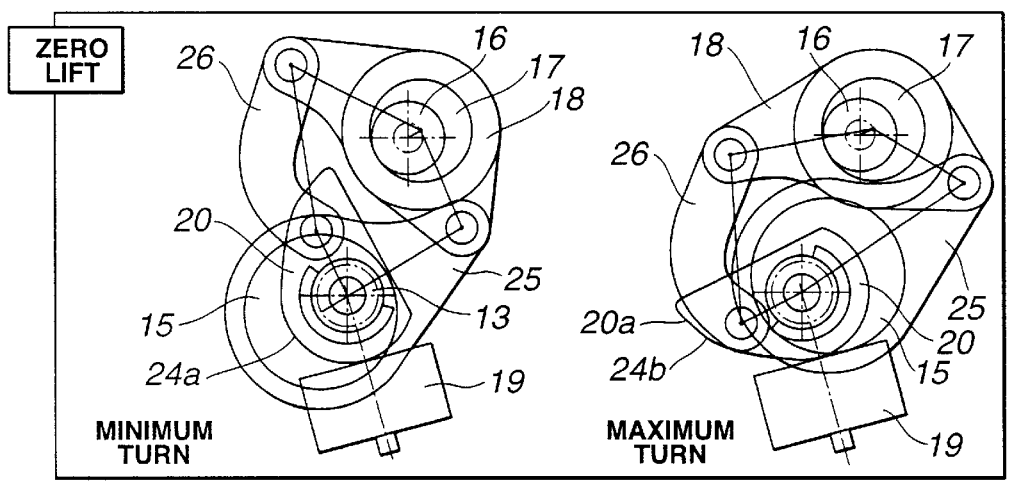
FIGS. 3A and 3B are schematic views for illustrating an operation of a lift and operation angle control mechanism of the variable valve timing control apparatus of FIG. 1.

For example, when eccentric cam portion 17 is generally positioned in a higher place as shown in FIG. 3A, i.e., when the geometric center of eccentric cam portion 17 is located above the rotational axis of control shaft 16, rocker arm 18 is bodily moved into a higher place, thus causing end portion 20a of oscillation cam 20 to be moved into a higher position. Namely, when oscillation cam 20 is rotated into the initial position, cam surface 24b is caused to incline away from tappet 19. Accordingly, when oscillation cam 20 is caused to oscillate in response to rotation of drive shaft 13, basic circular surface 24a is brought into contact with tappet 19 for a longer period, whereas cam surface 24b is brought into contact with tappet 19 for a shorter period. Accordingly, the amount of lift is small, and an angular range from an opening timing to a closing timing, i.e., the operation angle is reduced.

Figure 3B:
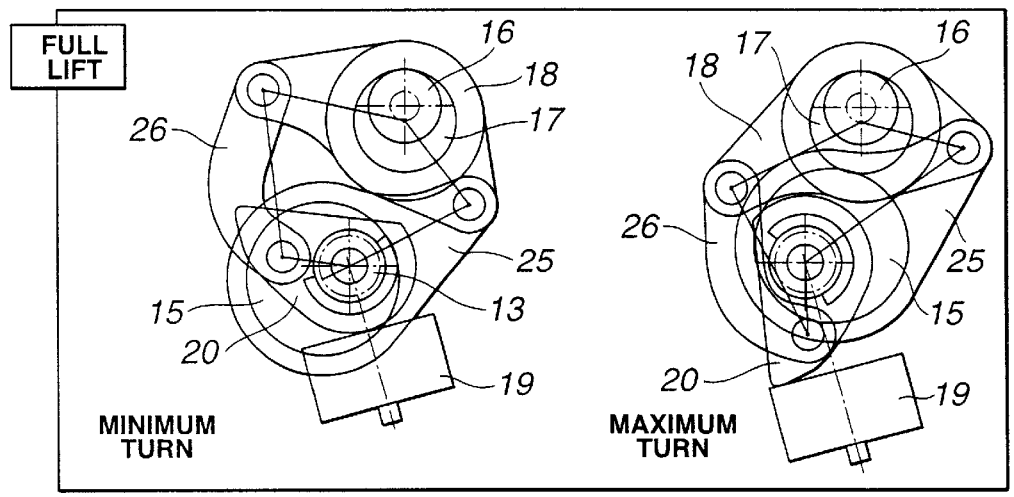

On the contrary, eccentric cam portion 17 is generally positioned in a lower place as shown in FIG. 3B, rocker arm 18 is bodily moved into a lower place, thus causing end portion 20a of oscillation cam 20 to move into a lower position. Namely, when oscillation cam 20 is rotated into the initial position, cam surface 24b is caused to incline toward tappet 19. Accordingly, when oscillation cam 20 oscillates in response to rotation of drive shaft 13, the place where oscillation cam 20 is brought into contact with tappet 19 changes immediately from basic circular surface 24a to cam surface 24b. Accordingly, the amount of lift becomes larger and the operation angle is enlarged.

Figure 4:
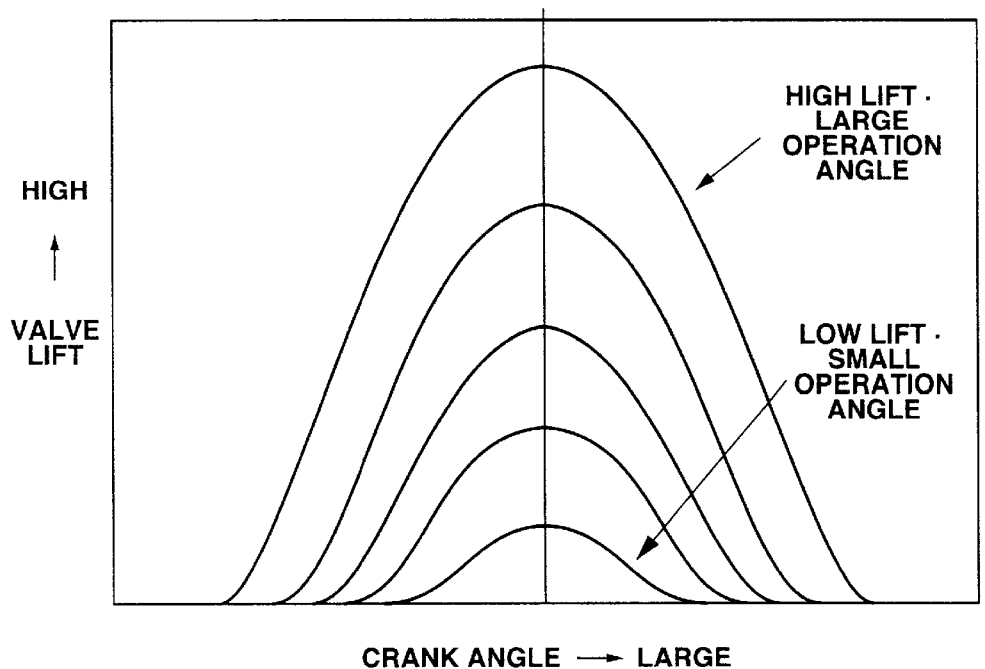
FIG. 4 is a diagram showing lift and operation angle variation characteristics of the lift and operation angle control mechanism.

Since the position of eccentric cam portion 17 can be varied continuously, the lift and operation angle characteristics of intake valve 12 can be varied continuously as shown in FIG. 4. Namely, both of the lift and operation angle can be increased and decreased simultaneously and continuously. Particularly, by lift and operation angle control mechanism 1, the opening and closing timings are varied so as to be nearly symmetrical with respect to the maximum lift phase, in response to a variation of the lift and operation angle.

Figure 5:
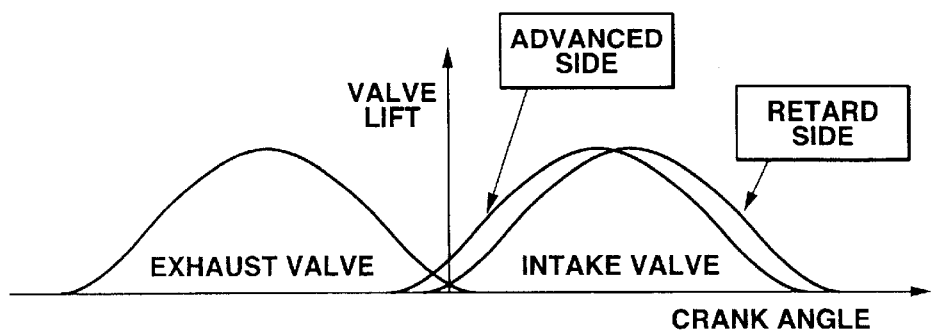
FIG. 5 is a diagram showing phase variation characteristics of a phase control mechanism of the variable valve timing control apparatus of FIG. 1.

As shown in FIG. 2, phase control mechanism 2 includes sprocket 35 provided to a front end portion of drive shaft 13, and hydraulic, phase control actuator 36 for rotating sprocket 35 relative to drive shaft 13 within a predetermined angular range. Sprocket 35 is drivingly connected to crankshaft 51 by way of the timing chain or timing belt (not shown) so as to be rotatable in timed relation to crankshaft 51. Supply of oil pressure to actuator 36 is controlled by second oil pressure controller 37 in response to a signal from engine control unit (ECU) 33. By the control of oil pressure to be supplied to actuator 36, sprocket 35 and drive shaft 13 are rotated relative to each other and the valve timing or phase is advanced or retarded as shown in FIG. 5. Namely, the curve representative of the valve lift characteristics does not change itself but is advanced or retarded in its entirety. Further, such a variation can be attained continuously. Phase control mechanism 2 is not limited to the hydraulic type but can have various other structures such as one utilizing an electromagnetic actuator.

Lift and operation angle control mechanism 1 and phase control mechanism 2 can be open-loop controlled by using sensors (not shown) for detecting an actual lift, operation angle and maximum lift phase or can be simply closed-loop controlled in response to an engine operating condition.

Figure 6:
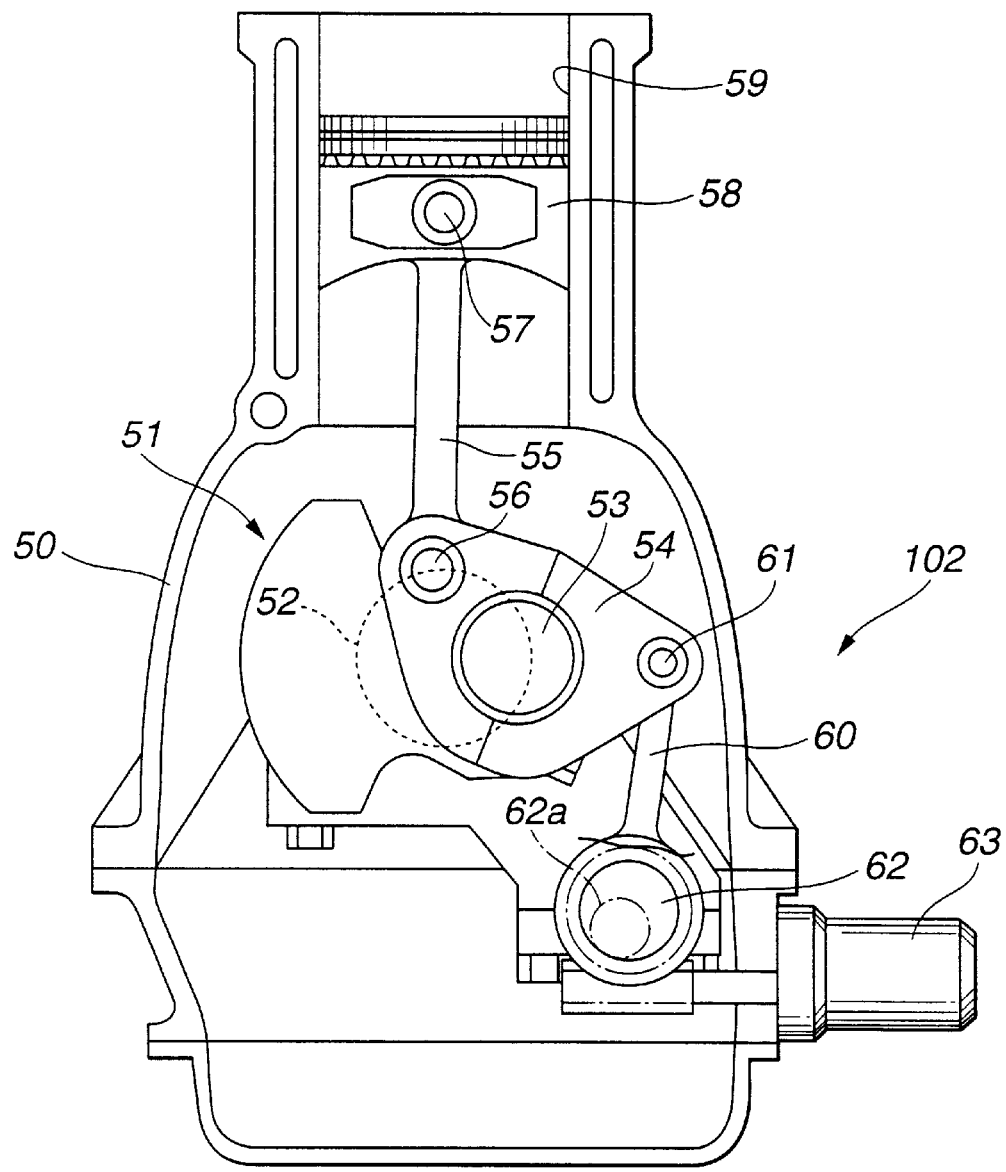
FIG. 6 is an enlarged schematic view of the engine of FIG. 1.

FIG. 6 shows compression ratio control mechanism 102.

Compression ratio control mechanism 102 includes crankshaft 51 having a plurality of journal portions 52 and a plurality of crank pins 53. On main bearings (not shown) installed on cylinder block 50 are rotatably supported journal portions 52. Crank pins 53 are offset from journal portions 52 by a predetermined amount. To each crank pin 53 is swingably or pivotally connected lower link 54 serving as a second link.

Lower link 54 is nearly T-shaped and made up of two separable sections. Nearly at a central portion of lower link 54 and between the separable sections is formed a connecting hole in which crank pin 53 is fitted.

Upper link 55 serving as a first link is pivotally connected at a lower end to one end of lower link 54 by means of connecting pin 56 and at an upper end to piston 58 by means of piston pin 57. Piston 58 is subjected to a combustion pressure and reciprocates within cylinder 59 of cylinder block 50. Above cylinder 59 are disposed intake valves 12 and exhaust valves (not shown).

Control link 60 that serves as a third link is pivotally connected at an upper end to the other end of lower link 54 by means of connecting pin 61 and at a lower end to the engine main body such as cylinder block 50 by way of control shaft 62. More specifically, control shaft 62 is rotatably mounted on the engine main body and has eccentric cam portion 62a to which the lower end of control link 60 is pivotally connected.

Rotational position of control shaft 62 is controlled by compression ratio control actuator 63 using an electric motor in response to a signal from engine control unit 33 (refer to FIG. 1).

In above described compression ratio control mechanism 102 using a double-link type piston crank mechanism, when control shaft 62 is turned by compression ratio control actuator 63, the center of eccentric cam portion 62a is moved relative to the engine main body. This causes a variation of the position at which the lower end of control link 60 is pivotally supported on the engine main body. A variation of the position of the lower end of control link 60 in turn causes a variation in the stroke of piston 58, thereby causing the position of piston 58 at the top dead center (TDC) to become higher or lower as shown in FIGS. 8A and 8B. By this, it becomes possible to change the compression ratio. FIGS. 8A and 8B show a high compression ratio condition and a low compression ratio condition, respectively. The compression ratio can be varied continuously between the high compression condition and low compression condition.

Above described double-link type compression ratio control mechanism 102 can attain such piston crank stroke characteristics that approximates a simple harmonic motion as shown in FIG. 7 by suitably selecting the link dimensions. The stroke characteristics approximating a simple harmonic motion has an advantage in vibration noise, particularly in that the piston speed at or adjacent TDC is slower by about 20% as compared with an usual single-link type piston crank mechanism. This is an advantage in formation and development of initial flame kernel under the condition of slow combustion speed, e.g., at the time of cold engine.

A concrete example of a link structure for approximating the piston motion to a simple harmonic motion will be described in the following.

Firstly, as shown in FIG. 9A, assuming that:
  the center of rotation of crankshaft 51 (i.e., center axis of journal portion 52) O is the origin;
  x-axis is selected as a line perpendicular to reciprocal axis 1 of piston pin 57;
  y-axis is selected as a line parallel to reciprocal axis 1; and
  the rotational direction of crank shaft 51 is determined as being counterclockwise;
  the x-coordinate of the reciprocal axis 1 (≈center axis of cylinder 59) that extends through center axis Oc of piston pin 57 is set negative and x-coordinate of center axis Oa of eccentric cam 62a about which control link 60 pivots is set positive.

As shown in FIG. 9B, assuming that:
  distance L between center axis O of crankshaft 51 and center axis Oe of crank pin 53 is L1;
  distance between axis Oe of crank pin 53 and axis Of of connecting pin 61 that relatively rotatably connects lower link 54 and control rod 60 is L2;
  the length of control link 60 is L3;
  the distance between center axis Oe of crank pin 53 and center axis Od of connecting pin 56 that relatively rotatably connects upper link 55 and lower link 54 is L4;
  the distance between center axis Of and center axis Od is L5;
  the length of upper link 55 is L6;
  the coordinates of pivotal axis Oa of control link 60 are (XC, YC); and
  the x-coordinate of reciprocal line 1 of piston pin 57 is x4;
  the link structure is adapted to establish the following ratio.
  L1:L2:L3:L4:L5:L6:XC:YC:x4 ≈1:2.4:2.65 to 3.5:0.69:3.0 to 3.4:3.3 to 3.55:3.2 to 3.55:−2 to −1.35:−1 to −0.6

In the meantime, though XC, YC are variable depending upon variations of the rotational position of control shaft 62, the above-described ratio is established when the rotational position of control shaft 62 is within a control range.

By such a link structure, the piston motion is approximated to a simple harmonic motion so that the piston motion at or adjacent TDC can be smoother.

Figure 10:
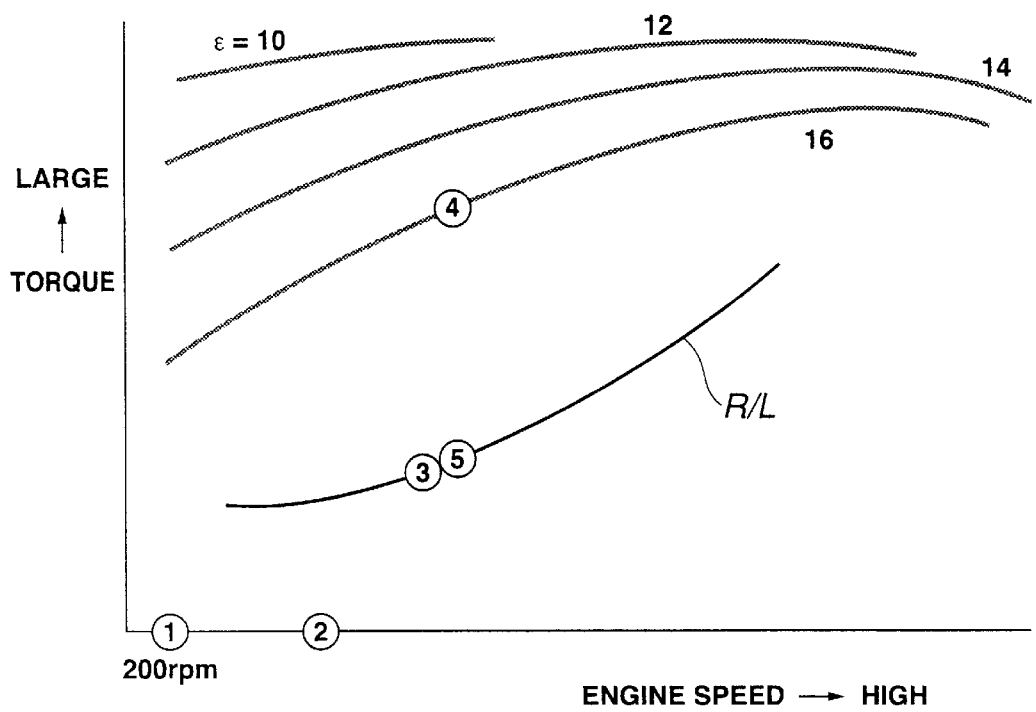
FIG. 10 is a diagram showing compression ratio control characteristics of the variable compression ratio control mechanism.

The compression ratio control characteristics of above described compression ratio control mechanism 102 are shown in FIG. 10. In the meantime, the compression ratio is a geometrical compression ratio ε that is determined depending upon only a volumetric variation of the combustion chamber that is caused by stroke of piston 58. In compression ratio control mechanism 102 that is combined with variable ignition timing control apparatus 101, the actual compression ratio is finally determined by the control of the intake valve closing timing. Namely, when intake valve 12 is closed in the middle of the intake stroke, compression is actually started from a crank angle position that is symmetrically opposite, with respect to a bottom dead center (BDC), to the crank angle position at which intake valve 12 is closed. Thus, even if a nominal compression ratio ε is high, the actual compression ratio is lowered when the intake valve closing timing is earlier than the bottom dead center.

Figure 11:
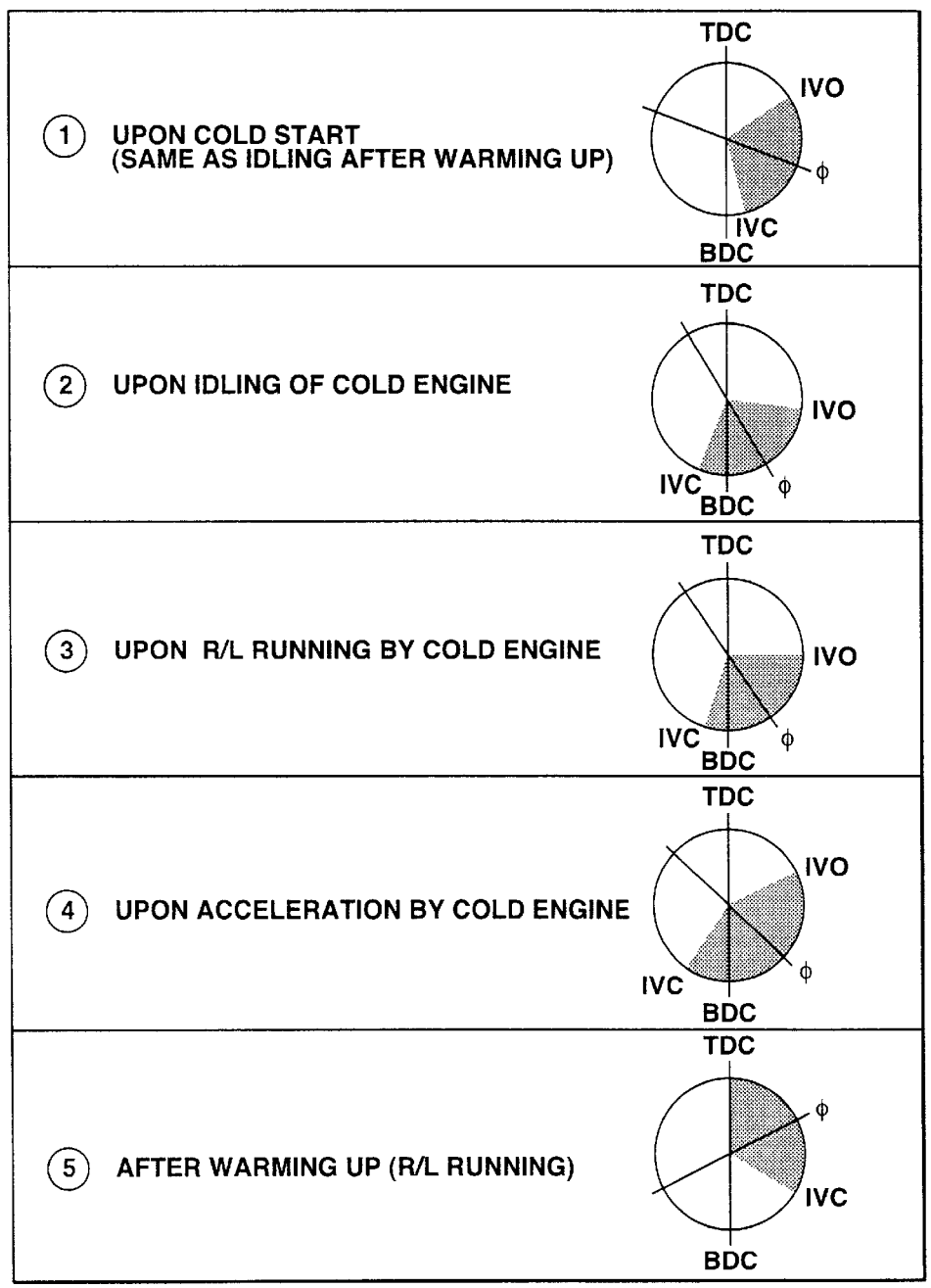
FIG. 11 is a diagram of valve lift characteristics obtained by the control system of the present invention in relation to representative operating conditions of the engine.

FIG. 11 shows the intake valve opening and closing timing control by variable valve timing control apparatus 101 under typical vehicle driving conditions. In the meantime, corresponding points (or zones) to the driving conditions are added to FIG. 10. In this instance, ① to ④ are the characteristics upon cold engine operation according to the present invention, and only ⑤ is the characteristics after warm-up of the engine (i.e., when the engine is hot), that are shown for reference. Further, the characteristics upon cold start are the same as the characteristics upon idling after warm-up of the engine. As shown in FIG. 1, the temperature condition or warm-up condition of the engine is determined by one of or both of coolant temperature sensor 105 provided to, for example, cylinder block 50 of the engine and catalyst temperature sensor 106 provided to catalytic exhaust gas purifier 104.

As shown, in the characteristics ① upon cold engine operation, the operation angle is set to be small and the maximum lift phase φ is retarded so that the intake valve closing timing is set at a point a little earlier than the bottom dead center (BDC). Since the intake valve closing timing is set at a point adjacent the bottom dead center, decrease of the actual compression ratio is not caused. In the characteristics ② upon high idling of cold engine and the characteristics ③ upon R/L (road load) running by cold engine, the operation angle is maintained small and the maximum lift phase is further retarded so that the intake valve opening timing is retarded as much as possible. Though the intake valve closing timing is after the bottom dead center, it is set adjacent BDC and therefore decrease of the actual compression ratio is small. In the meantime, the ignition timing is retarded for warming up the catalyst of catalytic exhaust gas purifier 104. Upon high idling of cold engine, the degree of retardation of the ignition timing is maximized though varies depending upon the combustion condition. Namely, upon high idling, the ignition timing is retarded largely from a MBT (Minimum Spark Advance for Best Torque) point. In the meantime, the degree of retardation of the ignition timing from the MBT point is preferably reduced gradually with increase of the engine load. In the characteristics ④ upon acceleration by cold engine, for the necessity of making higher the intake mixture charging efficiency, the operation angle is enlarged and the intake valve opening timing is advanced. The intake valve closing timing is after the bottom dead center. In the characteristics ⑤ upon R/L running after warm-up, the intake valve opening timing is set at a point coinciding with a top dead center (TDC) for preventing production of vacuum and the intake valve closing timing is determined so as to advance considerably from the bottom dead center. By this, though the actual compression ratio is lowered, the nominal compression ratio ε is set to be high after warm-up, thus making it possible to attain an effective pump loss reducing effect without deteriorating the combustion. The R/L running is herein used to indicate running of the vehicle wherein the engine speed and engine load are constant and the throttle opening is ¼ of full throttle.

FIG. 12 is a list for illustrating the effects that the intake valve operation characteristics and the compression ratio produce on the exhaust gas temperature and the unburnt HC when the engine is cold. In this instance, an exhaust gas temperature elevating effect is shown by an arrow, i.e., the arrow head directed upward indicates that the effect is contributive to elevation of the exhaust gas temperature and the arrow head directed downward indicates that the effect is adverse to elevation of the exhaust gas temperature. In the meantime, while it is also shown in FIG. 12 whether a variation of the retard limit of the ignition timing is in the direction of enlargement or reduction, the evaluation of the exhaust temperature elevating effect is made on the assumption that the ignition timing is retarded to the limit. Hereinafter, description will be made to each item.

(1) Retard (Retard From TDC) of Intake Valve Opening Timing (IVO)

When this is the case, intake mixture is not introduced into the cylinder at the initial stage of the intake stroke so that the vacuum within the cylinder increases rapidly. Further, the piston speed is maximized at the center of the stroke and simply increases as piston 58 moves from the top dead center to the center of the stroke. Thus, by retardation of the intake valve opening timing, a large intake mixture flow speed is caused when the intake valve is opened. Increase of the vacuum within the cylinder is herein used for elevation of the temperature of intake mixture though it causes an increase of the pumping loss. Increase of the intake mixture flow speed is largely effective for promoting atomization of the fuel injected into the intake port. Further, since the combustion speed itself increases in accordance with increase in the degree of turbulence of the intake mixture, the ignition timing can be retarded by the amount corresponding to increase of the combustion speed.

(2) Making Intake Valve Lift Smaller

When the intake valve lift is small, the intake mixture flow speed is increased by the amount corresponding to decrease of the opening area of the intake port. Particularly, there is a nozzle effect (effect of minimum restricted portion) between the intake valve and the seat. Such nozzle effect is largely effective for promoting atomization of the fuel injected into the intake port, thus decreasing the unburnt HC.

(3) Retard (Retard From BDC) of Intake Valve Closing Timing (IVC)

By retarding the intake valve closing timing (IVC) from the bottom dead center (BDC), the actual compression ratio is lowered. This is because the air-fuel mixture drawn into the cylinder is caused to flow backward at the initial stage of the compression stroke. As a matter of course, such retard is accompanied by decrease of the charging efficiency and therefore the intake vacuum is lowered. Decrease of the actual compression ratio causes the temperature of the air-fuel mixture at the time of compression to fall, thus lowering the combustion speed and imposing restrictions on retard of the ignition timing.

Further, decrease of the intake vacuum deteriorates atomization of fuel and is therefore causative of lowering the combustion speed, thus increasing the unburnt HC.

(4) Advance (Advance From BDC) of Intake Valve Closing Timing (IVC)

When the intake valve closing timing is advanced to a point before the bottom dead center, the actual compression ratio is lowered similarly to the above-described retard of the intake valve closing timing. This is because, differing in phenomenon from retard of the intake valve closing timing, the mixture drawn into the cylinder is expanded adiabatically until the bottom dead center after closure of the intake valve and therefore the temperature of the mixture at the bottom dead center is lowered. As a matter of course, such advance is accompanied by decrease in the charging efficiency and therefore the intake vacuum is decreased. Accordingly, the combustion speed is lowered to put restrictions on retard of the ignition timing.

(5) In Case of Making Intake Valve Closing Timing Closer to BDC

In this case, reversely to the above-described characteristics ③ and ④, the actual compression ratio is elevated and the intake vacuum is increased or intensified, thus causing the combustion temperature to rise and the retard limit of the ignition timing is enlarged.

(6) When the Compression Ratio $\epsilon$ is Made Higher

When the compression ratio $\epsilon$ is made higher, the temperature at or adjacent the top dead center is caused to rise. Thus, good combustion can be attained even if the ignition timing is retarded. However, since the expansion ratio is increased, the exhaust temperature is lowered when the expansion ratio is increased considerably. In this case, the S/V (surface-to-volume) ratio is increased.

(7) When the compression ratio $\epsilon$ is made smaller

When the compression ratio $\epsilon$ is made smaller, the expansion ratio is decreased and the exhaust temperature is increased considerably. However, since the temperature at or adjacent the top dead center is decreased, improvement of the combustion is necessitated. When the combustion speed becomes lower, there is caused a limitation to retard of the ignition timing. However, in case the piston stroke characteristics are approximated to the above-described simple harmonic vibration, the retard limit is enlarged, thus making it possible to compensate for the limitation of retard of the ignition timing due to decrease of the combustion speed and attain the exhaust temperature elevating effect due to decrease of the expansion ratio. This is particularly effective when the above-described (1), (2) and (5) are combined, and sufficiently good combustion is obtained. In this case, the S/V ratio is decreased.

(8) When the Compression Ratio $\epsilon$ is Made Higher and the Ignition Timing is not Retarded (for Reference)

Combustion becomes better and the compression ratio is increased, thus causing the efficiency to become better. Accordingly, the temperature of the exhaust gas is lowered.

(9) When the Compression Ratio is Made Lower and the Ignition Timing is not Retarded (for Reference)

Combustion becomes slower and the expansion ratio is lowered, so that the efficiency becomes worse and the exhaust temperature becomes higher. However, the effect of the retard is still predominant.

Figure 13:
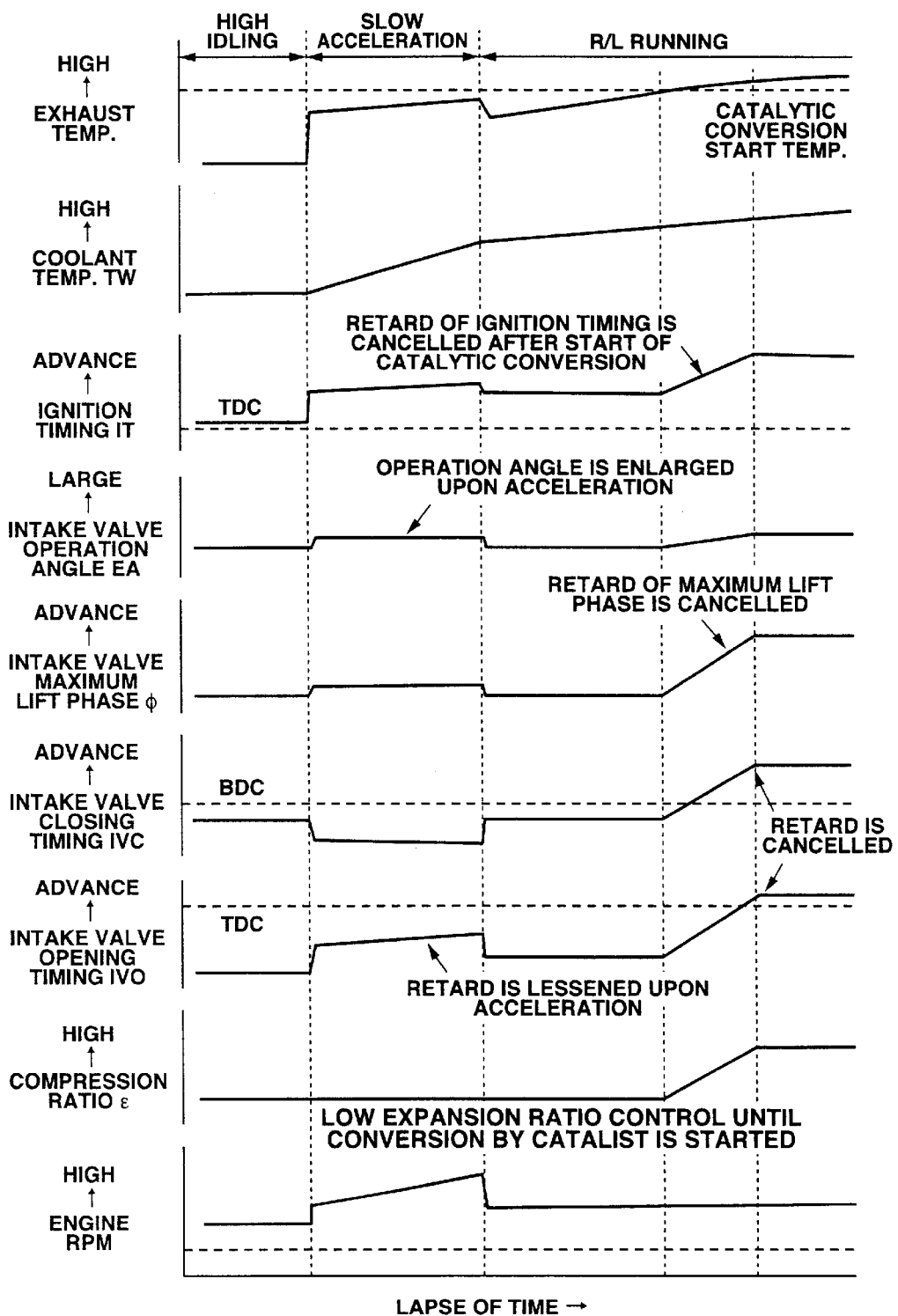
FIG. 13 is a time chart of operations of various portions of the engine after cold start.

FIG. 13 is a time chart for illustrating a control performed at the transition from the high idling condition after cold start to the R/L running through the slow acceleration. When the engine in a cold condition is started and put into self-sustaining operation, the rpm is set higher than that at idling after warm-up, i.e., the engine is put into a so-called high idling condition. From this time onward, it is necessary to execute a control for maximizing the exhaust gas temperature for the exhaust gas purification.

In this example, upon high idling, the compression ratio $\epsilon$ is set low for making lower the expansion ratio, and at the same time the characteristics of the intake valve are varied in such a manner that the operation angle is made smaller (this is for enlarging the freedom of retardation) and the intake valve opening timing (IVO) is retarded largely in combination with retard of the maximum lift phase $\phi$. In this instance, the intake valve closing timing (IVC) is set at a point after the bottom dead center. This is for retarding the intake valve opening timing (IVO) maximumly. However, since the intake valve opening timing (IVO) is set at a point adjacent the bottom dead center (BDC), though after BDC, the influence on the actual compression ratio is small. Upon this high idling, the degree of retard of the ignition timing is maximized though varies depending upon the combustion condition. More specifically, the ignition timing that is to be set at about 20° CA before the top dead center after warm-up is retarded up to a point adjacent the top dead center.

When acceleration is made from high idling, the compression ratio $\epsilon$ is maintained at the minimum value though the engine is in a cold state. By this, the exhaust temperature elevating effect is attained and the problem of knock is not caused. Exhaust gas purifier 104 soon reaches the conversion starting temperature. From this time onward, retard of the ignition timing is cancelled gradually and the compression ratio $\epsilon$ is lowered gradually for thereby changing the control so as to regulate the intake valve opening timing (IVO) and the intake valve closing timing (IVC) to the target values.

FIG. 13 is a flow chart of a control routine to be executed by the control system of this invention when the engine is cold or hot. Firstly, in step S1, it is judged whether the coolant temperature and the catalyst temperature are equal to or higher than respective predetermined temperatures and then it is judged, based on the judgment on the coolant temperature and the catalyst temperature, whether the engine is cold or hot. When the engine is judged cold, the program proceeds to step S2. In step S2, selection of maps for respective control of the compression ratio $\epsilon$, ignition timing IT, intake valve opening timing (IVO) and intake valve closing timing (IVC) is made. In step S3, an actual engine operating condition (engine rpm, throttle opening degree) at that time is detected and a control corresponding to the detected engine operating condition is made on the basis of the selected maps. Namely, in steps S4 and S5, variable compression ratio control mechanism 102 is controlled so that the compression ratio e becomes equal to a target value. In steps S6 and S7, lift and operation angle control mechanism 1 and phase control mechanism 2 are controlled so that the intake valve opening timing (IVO) and the intake valve closing timing (IVC) become equal to respective target values. Further, in steps S8 and S9, ignition timing control system 103 is controlled so that the ignition timing IT becomes equal to a target value.

When the engine is judged hot in step S1, the control proceeds to step S12 to select control maps for hot engine. From this step onward, a control similar to that described above is carried out. Namely, steps S12 to Sl9 correspond to steps S2 to S9, respectively, so that a repeated description thereto is omitted.

In the foregoing, it is to be noted that the above described control of variable valve timing apparatus 101 and compression ratio control mechanism 102 are executed by a control program incorporated in ECU 33.

From the foregoing, it will be understood that the present invention provides a continuous combustion control that can continuously improve the combustion by variably controlling the geometric expansion ratio of the internal combustion engine and further by variably controlling the intake valve opening timing (IVO) and the intake valve closing timing (ICO) in combination with the variable control of the geometric expansion ratio. Such a continuous combustion control makes it possible to elevate the exhaust gas temperature considerably without deteriorating the operation ability of the engine, under almost all engine operating conditions including cold start, acceleration, operation at R/L running and warm-up operation for activating catalyst. Further, by combining a retard control of considerably retarding the ignition timing with such a combustion control, the present invention makes it possible to elevate the temperature of catalyst rapidly while suppressing deterioration of the exhaust gas that is otherwise caused by deterioration of the fuel consumption and misfire.

It will be further understood that by making lower in level the top dead center position of the piston 58 by using the variable compression ratio control mechanism 102, the expansion ratio for the movement of the piston from the top dead center to the point where the exhaust valve opens is lowered. When the expansion ratio is lowered in this manner, the combustion efficiency is lowered and the exhaust temperature is elevated. Accordingly, by combining the control of the top dead center position of the piston with considerable retard of the ignition timing, the exhaust temperature can be elevated efficiently. In this connection, it is preferable that when the engine is cold, the intake valve closing timing is set at a point more adjacent the bottom dead center than the exhaust valve opening timing and the actual compression ratio is higher than the expansion ratio. When the top dead center position of the piston is lowered thereby lowering the expansion ratio, the temperature within the cylinder when the piston is at the top dead center is lowered. However, decrease of the temperature within the cylinder when the piston is at or adjacent the top dead center and the resulting deterioration of combustion can be compensated for by making higher the actual compression ratio.

It will be further understood that by lowering the top dead center position of the piston, the temperature within the cylinder when the piston is at or adjacent the top dead center is lowered. Such decrease in the temperature and the resulting deterioration of combustion can be compensated for by setting the intake valve closing timing at a point closer to the bottom dead center and thereby making the actual compression ratio as high as possible.

It will be further understood that according to the present invention, the lift and operation angle are set to be small when the engine is cold. By this, it becomes possible to retard the ignition timing largely and attain an efficient rise of the exhaust gas temperature.

It will be further understood that according to the present invention, the compression ratio control mechanism comprises a double-link type piston-crank mechanism that is constructed so that a maximum acceleration of the piston when the piston is at or adjacent a top dead center is equal to or smaller than that when the piston is at or adjacent a bottom dead center. Such a structure causes the reciprocal motion of the piston in response to the rotation of the crankshaft to approximate to a simple harmonic motion. When the engine is cold, the combustion speed is slow. The simple harmonic motion allows the piston speed at or adjacent the top dead center to become slower and thereby allows time for an initial flame kernel to grow and propagate. Thus, such a double-link piston-crank mechanism is effective for obtaining stable combustion even when the engine is cold.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A control system for an internal combustion engine having a compression ratio control mechanism capable of varying a compression ratio of the engine by varying a top dead center position of a piston and an ignition timing control system capable of varying an ignition timing of the engine, the control system comprising:

an engine control unit for controlling the compression ratio control mechanism and the ignition timing control system so that the compression ratio is varied depending upon variations of engine rpm, engine load and a warm-up condition of the engine and that when the engine is cold, the ignition timing is retarded from a MBT point and the piston top dead center position is made lower in level than that obtained when the engine is hot and operated at corresponding engine rpm and engine load.

2. A control system according to claim 1, wherein the engine further includes a lift and operation angle control mechanism capable of varying a lift and operation angle of an intake valve of the engine simultaneously and continuously and a phase control mechanism capable of varying a maximum lift phase of the intake valve, and wherein the engine control unit controls the lift and operation angle control mechanism, the phase control mechanism and the compression ratio control mechanism so that when the engine is cold, an intake valve closing timing is set at a point more adjacent a bottom dead center than an exhaust valve opening timing and an actual compression ratio is higher than an expansion ratio.

3. A control system according to claim 1, wherein the engine further includes a lift and operation angle control mechanism capable of varying a lift and operation angle of an intake valve of the engine simultaneously and continuously, and wherein the engine control unit controls the lift and operation angle control mechanism so that the lift and operation angle are varied continuously depending upon variations of the engine rpm and the engine load and that when the engine is cold, the lift and operation angle are set smaller than that obtained when the engine is hot.

4. A control system according to claim 1, wherein the engine further includes a phase control mechanism capable of varying a maximum lift phase of an intake valve of the engine, and wherein the engine control unit controls the phase control mechanism so that when the engine is cold, the maximum lift phase of the intake valve is retarded so as to retard an intake valve opening timing to a point after an intake top dead center.

5. A control system according to claim 4, wherein the engine control unit controls the phase control mechanism so that retard of the maximum lift phase is increased when a lift and operation angle of the intake valve are small.

6. A control system according to claim 1, wherein the engine control unit controls the ignition timing control system so that retard of the ignition timing from the MBT point is decreased gradually with increase of the engine load.

7. A control system according to claim 1, wherein the engine further includes an exhaust system having a catalytic exhaust gas purifier and a sensor that detects a temperature of the catalytic exhaust gas purifier and serves as a device for detecting the warm-up condition of the engine.

8. A control system according to claim 1, wherein the engine further includes a sensor that detects a coolant temperature of the engine and serves as a device for detecting the warm-up condition of the engine.

9. A control system according to claim 4, wherein the phase control mechanism comprises a sprocket driven in timed relation to a crankshaft of the internal combustion engine, a drive shaft driven by the sprocket, and a mechanism for varying a relative phase of the sprocket and the drive shaft.

10. A control system according to claim 3, wherein the lift and operation angle control mechanism comprises an eccentric cam rotatable with a drive shaft, a pivotal link pivotally mounted on the eccentric cam, a control shaft disposed in parallel with the drive shaft and having an eccentric cam portion, a rocker arm pivotally mounted on the eccentric cam portion of the control shaft, the rocker arm having an end portion to which a protruded arm portion of the pivotal link is pivotally connected and another end portion to which an upper end of a connecting rod is pivotally connected, and an oscillation cam pivotally mounted on the drive shaft and has a laterally protruded end portion to which a lower end of the connecting rod is pivotally connected such that a variation of rotational position of the control shaft causes simultaneous variations of the lift and operation angle of the intake valve.

11. A control system according to claim 1, wherein the compression ratio control mechanism comprises a double-link type piston-crank mechanism including a first link connected at one of opposite ends to a piston pin of the piston, a second link connecting between the other of the opposite ends of the first link and a crank pin of a crankshaft of the engine, and a third link connected at one of opposite ends to the second link and at the other of the opposite ends to a main body of the engine.

12. A control system according to claim 11, wherein the double-link type piston-crank mechanism is constructed so that a maximum acceleration of the piston when the piston is at or adjacent a top dead center is equal to or smaller than that when the piston is at or adjacent a bottom dead center.

13. An internal combustion engine comprising:
 a compression ratio control mechanism capable of varying a compression ratio of the engine by varying a top dead center position of a piston;
 an ignition timing control system capable of varying an ignition timing of the engine; and
 a control unit for controlling the compression ratio control mechanism and the ignition timing control system so that the compression ratio is varied depending upon variations of engine rpm, engine load and a warm-up condition and that when the engine is cold, the ignition timing is retarded from a MET point and the piston top dead center position is made lower in level than that obtained when the engine is hot and operated at corresponding engine rpm and engine load.

14. An internal combustion engine according to claim 13, wherein the engine further includes a lift and operation angle control mechanism capable of varying a lift and operation angle of an intake valve of the engine simultaneously and continuously and a phase control mechanism capable of varying a maximum lift phase of the intake valve, and wherein the engine control unit controls the lift and operation angle control mechanism, the phase control mechanism and the compression ratio control mechanism so that when the engine is cold, an intake valve closing timing is set at a point more adjacent a bottom dead center than an exhaust valve opening timing and an actual compression ratio is higher than an expansion ratio.

15. An internal combustion engine according to claim 13, wherein the engine further includes a lift and operation angle control mechanism capable of varying a lift and operation angle of an intake valve of the engine simultaneously and continuously, and wherein the control unit controls the lift and operation angle control mechanism so that the lift and operation angle are varied continuously depending upon variations of the engine rpm and the engine load and that when the engine is cold, the lift and operation angle are set smaller than that obtained when the engine is hot.

16. An internal combustion engine according to claim 13, wherein the engine further includes a phase control mechanism capable of varying a maximum lift phase of an intake valve of the engine, and wherein the control unit controls the phase control mechanism so that when the engine is cold, the maximum lift phase of the intake valve is retarded so as to retard an intake valve opening timing to a point after an intake top dead center.

17. A control system according to claim 16, wherein the engine control unit controls the phase control mechanism so that retard of the maximum lift phase is increased when a lift and operation angle of the intake valve are small.

18. An internal combustion engine according to claim 13, wherein the engine control unit controls the ignition timing control system so that retard of the ignition timing from the MBT point is decreased gradually with increase of the engine load.

19. A method for controlling an internal combustion engine having a compression ratio control mechanism capable of varying a compression ratio of the engine by varying a top dead center position of a piston, an ignition timing control system capable of varying an ignition timing of the engine, a detector for detecting engine rpm and engine load, and a detector for detecting a warm-up condition of the engine, the method comprising:

controlling the compression ratio control mechanism and the ignition timing control system so that the compression ratio is varied depending upon variations of the engine rpm, the engine load and the warm-up condition and that when the engine is cold, the ignition timing is retarded from a MBT point and the piston top dead center position is made lower in level than that obtained when the engine is hot and operated at corresponding engine rpm and engine load.

20. A method according to claim 19, wherein the engine further includes a lift and operation angle control mechanism capable of varying a lift and operation angle of an intake valve of the engine simultaneously and continuously and a phase control mechanism capable of varying a maximum lift phase of the intake valve, and wherein the method further comprises controlling the lift and operation angle control mechanism, the phase control mechanism and the compression ratio control mechanism so that when the engine is cold, an intake valve closing timing is set at a point more adjacent a bottom dead center than an exhaust valve opening timing and an actual compression ratio is higher than an expansion ratio.

21. A method according to claim 19, wherein the engine further includes a lift and operation angle control mechanism capable of varying a lift and operation angle of an intake valve of the engine simultaneously and continuously, and wherein the method further comprises controlling the lift and operation angle control mechanism so that the lift and operation angle are varied continuously depending upon variations of the engine rpm and the engine load and that when the engine is cold, the lift and operation angle are set smaller than that obtained when the engine is hot.

22. A method according to claim 19, wherein the engine further includes a phase control mechanism capable of varying a maximum lift phase of an intake valve of the engine, and wherein the method further comprises controlling the phase control mechanism so that when the engine is cold, the maximum lift phase of the intake valve is retarded so as to retard an intake valve opening timing to a point after an intake top dead center.

23. A method according to claim 22, further comprising controlling the phase control mechanism so that retard of the maximum lift phase is increased when the lift and the operation angle are small.

24. A method according to claim 19, further comprising controlling the ignition timing control system so that retard of the ignition timing from the MBT point is decreased gradually with increase of the engine load.

* * * * *